United States Patent
Kosaka

(10) Patent No.: US 10,731,657 B2
(45) Date of Patent: Aug. 4, 2020

(54) DRIVE DEVICE AND BLOWER DEVICE

(71) Applicant: SHINANO KENSHI CO., LTD., Ueda-shi, Nagano (JP)

(72) Inventor: Hiroki Kosaka, Ueda (JP)

(73) Assignee: SHINANO KENSHI CO., LTD., Ueda (JP)

( * ) Notice: Subject to any disclaimer, the term of this patent is extended or adjusted under 35 U.S.C. 154(b) by 175 days.

(21) Appl. No.: 15/261,795

(22) Filed: Sep. 9, 2016

(65) Prior Publication Data
US 2017/0107994 A1 Apr. 20, 2017

(30) Foreign Application Priority Data

Oct. 15, 2015 (JP) .................................. 2015-204011

(51) Int. Cl.
| | |
|---|---|
| *F04D 29/056* | (2006.01) |
| *F04D 29/051* | (2006.01) |
| *F04D 29/053* | (2006.01) |
| *F04D 25/06* | (2006.01) |
| *F04D 29/28* | (2006.01) |
| *F04D 29/42* | (2006.01) |

(52) U.S. Cl.
CPC ....... *F04D 29/056* (2013.01); *F04D 25/0613* (2013.01); *F04D 29/051* (2013.01); *F04D 29/053* (2013.01); *F04D 29/283* (2013.01); *F04D 29/4206* (2013.01); *H02K 2205/03* (2013.01)

(58) Field of Classification Search
CPC .. F04D 29/056; F04D 29/4206; F04D 29/281; F04D 29/051; F04D 17/16; F04D 29/053; F04D 25/062
See application file for complete search history.

(56) References Cited

U.S. PATENT DOCUMENTS

| 5,645,355 A | * | 7/1997 | Tokushima | ............. F16C 33/10 384/133 |
|---|---|---|---|---|
| 6,507,135 B1 | * | 1/2003 | Winkler | ................ F04D 25/062 310/51 |
| 2012/0114512 A1 | * | 5/2012 | Lofy | ................... F04D 29/4226 417/410.1 |

FOREIGN PATENT DOCUMENTS

| GB | 2217784 A | 11/1989 |
|---|---|---|
| JP | S50-27303 U | 3/1975 |
| JP | 2009-118639 A | 5/2009 |

OTHER PUBLICATIONS

Feb. 17, 2017 Extended Search Report issued in European Patent Application No. 16188721.1.
May 10, 2019 Office Action issued in Chinese Patent Application No. 201610898654.X.

* cited by examiner

*Primary Examiner* — Patrick Hamo
*Assistant Examiner* — David N Brandt
(74) *Attorney, Agent, or Firm* — Oliff PLC

(57) ABSTRACT

A drive device includes: a board including an opening; and a motor including: a rotational shaft; a housing supporting the rotational shaft for rotation, fixed to the board so as to surround the opening, and having a cylindrical shape; a bearing supporting the rotational shaft for rotation and press-fitted onto an inner peripheral surface of the housing; and a thrust cover supporting an end of the rotational shaft and fixed onto the inner peripheral surface of the housing by an adhesive.

5 Claims, 7 Drawing Sheets

DRIVE DEVICE AND BLOWER DEVICE

CROSS-REFERENCE TO RELATED APPLICATION

This application is based upon and claims the benefit of priority of the prior Japanese Patent Application No. 2015-204011, filed on Oct. 15, 2015, the entire contents of which are incorporated herein by reference.

BACKGROUND (i) Technical Field

The present invention relates to a drive device and a blower device.

(ii) Related Art

Japanese Unexamined Patent Application Publication No. 2009-118639 discloses an outer rotor type motor in which screws fix an thrust cover to a housing into which a bearing is press-fitted.

However, the use of screw might lead to an increase in the number of parts and an increase in the manufacturing cost. Further, it is conceivable for an adhesive to fix both without using a screw. However, bonding force of the adhesive might be insufficient, so the thrust cover might fall off from the housing.

SUMMARY

According to an aspect of the present invention, there is provided a drive device including: a board including an opening; and a motor including: a rotational shaft; a housing supporting the rotational shaft for rotation, fixed to the board so as to surround the opening, and having a cylindrical shape; a bearing supporting the rotational shaft for rotation and press-fitted onto an inner peripheral surface of the housing; and a thrust cover supporting an end of the rotational shaft and fixed onto the inner peripheral surface of the housing by an adhesive, wherein an inner edge of the opening includes: a first recessed portion recessed radially outwardly from the opening; and a first projection portion projecting radially inwardly from the opening, an outer edge of the thrust cover includes: a second recessed portion recessed radially inwardly from the thrust cover; and a second projection portion projecting radially outwardly from the thrust cover, at least the first and second projection portions partially overlap each other when viewed in an axial direction of the rotational shaft, a first gap is defined between the second recessed portion and the inner peripheral surface of the housing in a radial direction of the rotational shaft, a second gap is defined between the first and second projection portions in the axial direction of the rotational shaft, and the adhesive is filled in the first and second gaps.

DETAILED DESCRIPTION

Figure 1:
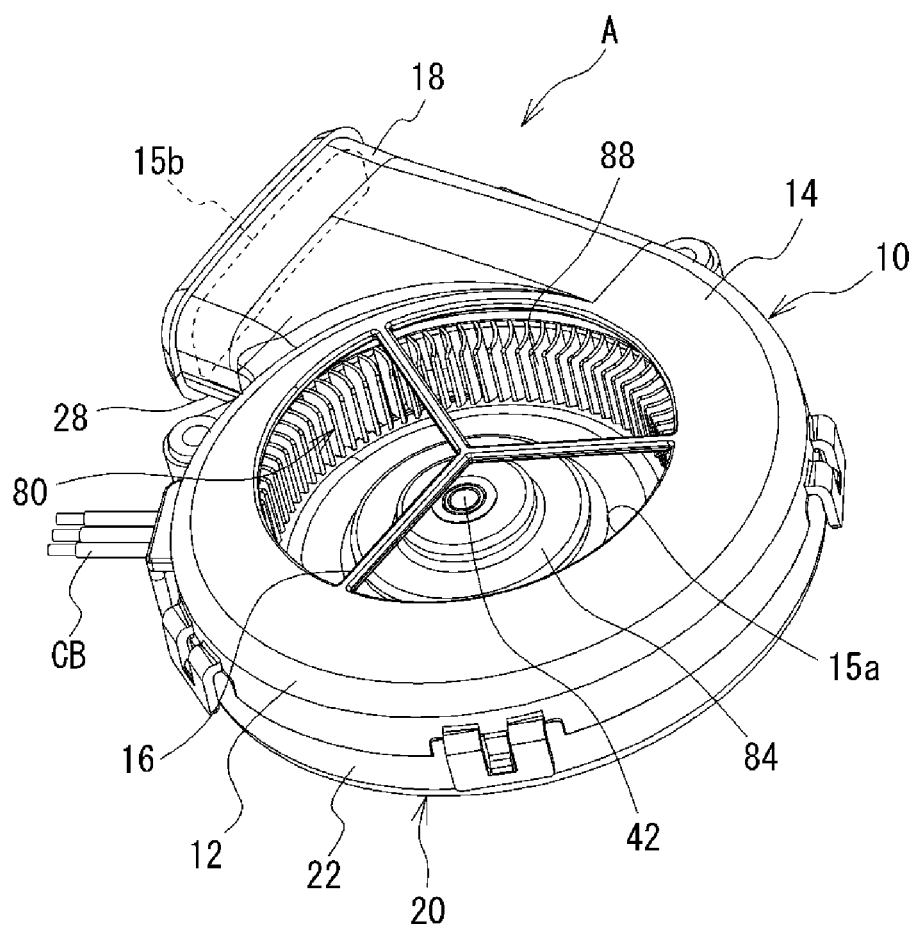
FIG. 1 is an external view of a blower device according to the present embodiment.
Figure 2:
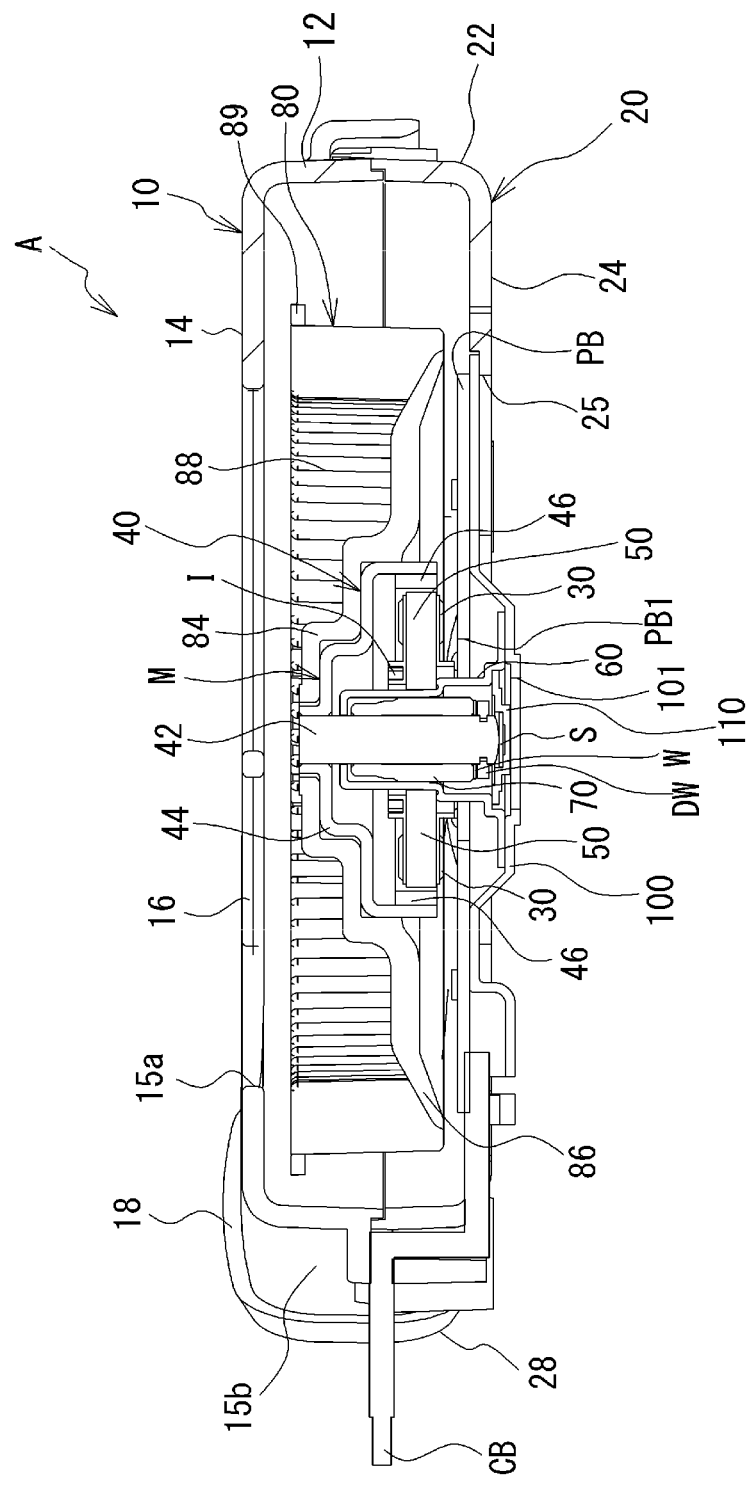
FIG. 2 is a cross-sectional view of the blower device according to the present embodiment.

FIG. 1 is an external view of a blower device A according to the present embodiment. FIG. 2 is a cross-sectional view of the blower device. The blower device A includes an upper case 10, a lower case 20, a fan 80, and the like. The upper case 10 and the lower case 20 are assembled and fixed to each other in the axial direction of the fan 80. The upper case 10 and the lower case 20 define a single scroll-shaped case in cooperation. The upper case 10 and the lower case 20 are made of synthetic resin. The upper case 10 includes a peripheral wall portion 12, an upper wall portion 14, and a projection wall portion 18. The peripheral wall portion 12 surrounds an outer circumferential portion of the fan 80 and has a substantially cylindrical shape. The upper wall portion 14 continuous from the peripheral wall portion 12 is located above the fan 80 in the axial direction. It should be noted that the axial direction means the direction of the central axis of the rotation of the fan 80. The upper wall portion 14 includes an opening 15a through which air passes in response to the rotation of the fan 80. An upper portion of the fan 80 is exposed from the opening 15a. The upper wall portion 14 is provided with three bars 16 protecting the fan 80 exposed from the opening 15a and extending radially outwardly from the center of the opening 15a. The projection wall portion 18 partially extends radially outwardly from the peripheral wall portion 12 and the upper wall portion 14.

The lower case 20 includes a peripheral wall portion 22, a bottom wall portion 24, and a projection wall portion 28. The peripheral wall portion 22 surrounds the outer circumferential portion of the fan 80 and has a substantially cylindrical shape. The peripheral wall portions 12 and 22 are fixed to each other. The bottom wall portion 24 continuous from the peripheral wall portion 22 is located below the fan 80 in the axial direction. An opening 25 is formed at the approximate center of the bottom wall portion 24. The opening 25 is covered with a board 100. An opening 101 is formed at the approximate center of the board 100. The opening 101 is covered with the housing 60 and the thrust cover 110. The board 100 supports the fan 80 and a motor M rotating the fan 80. A cable CB conductively connected to the motor M is pulled out from the bottom wall portion 24. That is, the fan 80 and the motor M are housed within the upper case 10 and the lower case 20. The projection wall portion 28 partially extends radially outwardly from the peripheral wall portion 22 and the bottom wall portion 24. The projection wall portions 18 and 28 are fixed to each other. The projection wall portions 18 and 28 define a single opening 15b.

The rotation of the fan 80 causes one of the openings 15a and 15b to suck air, so air circulates within the upper case 10 and the lower case 20, and air is discharged from the other of the openings 15a and 15b. In this way, the rotation of the fan 80 causes air to pass through the openings 15a and 15b.

The blower device A is used, for example, to cool a battery mounted on a hybrid vehicle. This battery is used to store power generated by a generator driven by a hybrid vehicle engine. Incidentally, such application of the blower device A is not limited to this. Further, the rotation of the fan 80 causes the opening 15a to suck air and causes the opening 15b to discharge air, but the present embodiment is not limited to this. The opening 15b may suck air and the opening 15a may discharge air.

The fan 80 includes a dome portion 84, a flange portion 86, a blade portion 88, and a ring portion 89. The fan 80 is made of synthetic resin. The dome portion 84 extends radially outwardly, and extends downwardly as the dome portion 84 extends radially outwardly. The dome portion 84 has a stepped shape in cross section.

The flange portion 86 extends radially outwardly from the lower end portion of the dome portion 84. The flange portion 86 slightly inclines axially downwardly as the flange portion 86 extends radially outwardly. The blade portion 88 includes plural blades and extends in a substantially cylindrical shape from the outer peripheral edge portion of the flange portion 86. The plural blades are arranged in a circle at predetermined intervals such that air passes between adjacent blades. The blades extend axially. The peripheral wall portion 12 of the upper case 10 and the peripheral wall portion 22 of the lower case 20 are located in the outer peripheral side of the blade portion 88. The ring portion 89 is provided in the upper side of the outer peripheral side of the blade portion 88 and is connected to the upper edge portion of the blade portion 88. The rotation of the fan 80 introduces air into the upper case 10 and the lower case 20 from the opening 15a through the blade portion 88. Thus, air flows along the inside of the peripheral wall portions 12 and 22, so air is discharged from the opening 15b.

The motor M will be described. The motor M includes coils 30, a rotor 40, a stator 50, a housing 60, a printed circuit board PB, a thrust cover 110, and the like. The stator 50 is made of metal and has a substantially ring shape. The stator 50 is fixed to the outer peripheral surface of the housing 60. The housing 60 is fixed to the inner bottom surface of the board 100. A bearing 70 supporting a rotational shaft 42 for rotation is press-fitted into the housing 60. The bearing 70 is longer in the axial direction than in the radial direction.

The plural coils 30 are wound through an insulator I around the stator 50. The coils 30 are electrically connected to the printed circuit board PB. The printed circuit board PB has a conductive pattern formed on an insulating substrate with rigidity. The printed circuit board PB is supported by and fixed to the inner surface side of the board 100 and has an opening PB1 through which the housing 60 penetrates. Electronic components for supplying power to the coils 30 are mounted on the printed circuit board PB. The electronic components are, for example, an output transistor (switching element) such as an FET and a capacitor for control of the energization state of the coils 30. The electronic component may be, for example, a magnetic sensor output of which changes in response to the rotation of the rotor 40. The printed circuit board PB is conductively connected to the cable CB. The coils 30 is energized to excite the stator 50.

The rotor 40 includes the rotational shaft 42, a yoke 44, and one or more permanent magnets 46. The rotational shaft 42 is rotatably supported by the bearing 70. The lower end portion of the rotational shaft 42 is supported by the thrust cover 110 via a thrust receiving member S. An end portion of the rotational shaft 42 projecting downwardly from the bearing 70 is attached with a damper washer DW. A washer W through which the rotation shaft 42 penetrates is attached between the damper washer DW and the lower end portion of the bearing 70. An end portion of the rotational shaft 42 projecting upwardly from the housing 60 is fixed to the yoke 44 rotating together with the rotational shaft 42. The yoke 44 is made of metal and has a generally cylindrical shape. The fan 80 is fixed to the upper side of the yoke 44. One or more permanent magnets 46 are fixed to the inner peripheral surface of the yoke 44. The permanent magnets 46 face the outer circumferential surface of the stator 50. The coils 30 are energized to excite the stator 50. Therefore, the magnetic attractive force and the magnetic repulsive force are exerted between the permanent magnets 46 and the stator 50. This magnetic force causes the yoke 44, that is, the rotor 40 to rotate relative to the stator 50. Thus, the motor M is an outer rotor type motor in which the rotor 40 rotates. The rotation of the rotor 40 causes the fan 80 to rotate.

Figure 3:
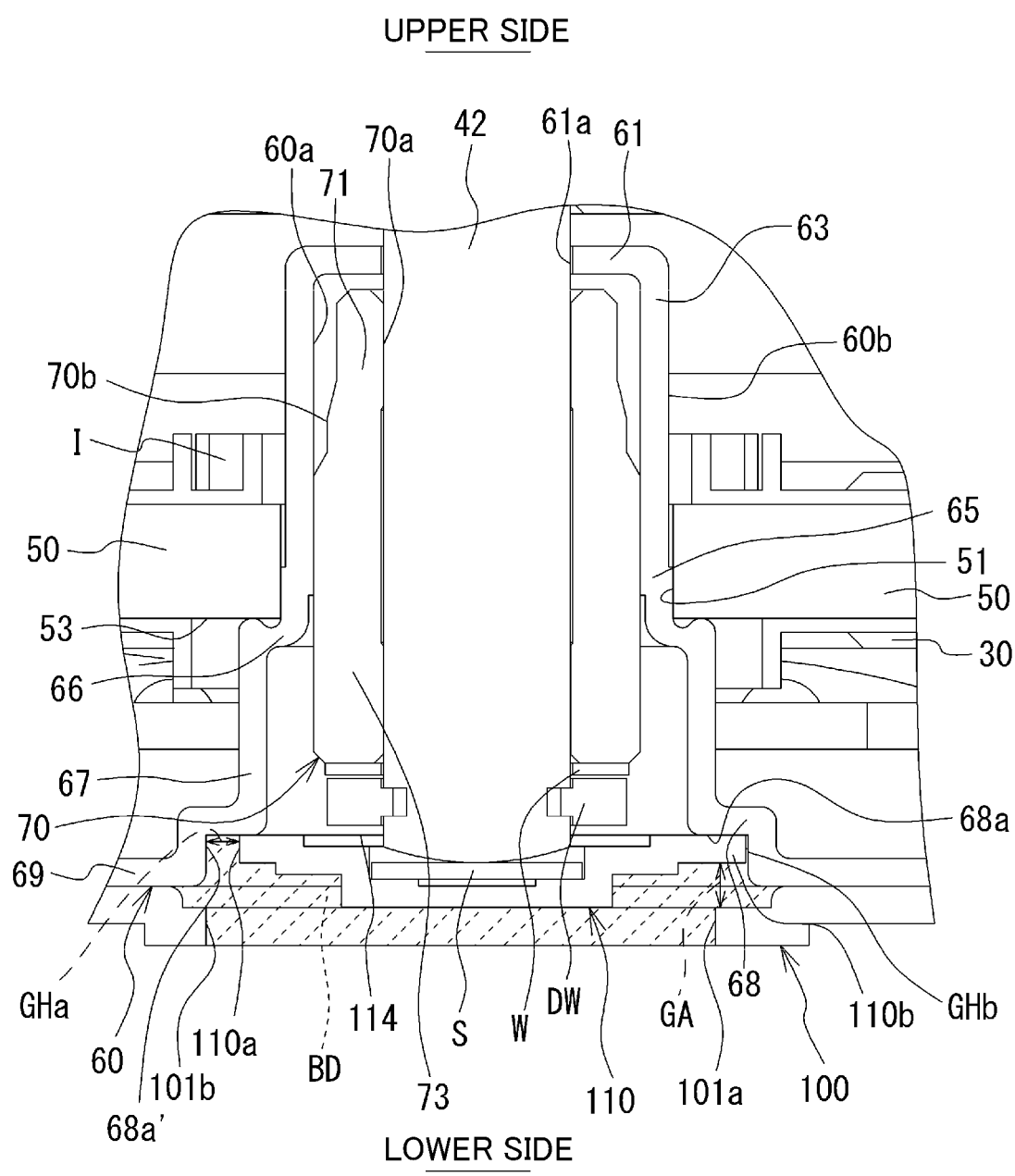
FIG. 3 is a partial enlarged view of FIG. 2.

FIG. 3 is a partially enlarged view of FIG. 2. The bearing 70 has an inner peripheral surface 70a and an outer peripheral surface 70b. The rotational shaft 42 is disposed in the inner peripheral surface 70a side. The housing 60 is disposed in the outer peripheral surface 70b side. As will be described later, the inner peripheral surface 70a of the bearing 70 partially slides on the outer peripheral surface of the rotational shaft 42. The bearing 70 has a tapered portion 71 and a base portion 73 in this order from the upper side to the lower side. The tapered portion 71 has an outer diameter smaller than the base portion 73. The outer diameter of the tapered portion 71 decreases toward the upper side. The outer diameter of the base portion 73 is substantially constant. The inner diameters of the tapered portion 71 and the base 73 will be described later. In addition, the upper side is a side in which the opening 15a of the upper case 10 through which air passes is formed. The lower side is the board 100 side in which an opening through which air passes is not formed.

The housing 60 has an inner peripheral surface 60a and an outer peripheral surface 60b. The bearing 70 is disposed in the inner peripheral surface 60a side, and the stator 50 and the like are disposed in the outer peripheral surface 60b side. The housing 60 has a top portion 61, an upper tubular portion 63, a small stepped portion 65, a middle stepped portion 66, a lower tubular portion 67, a lower stepped portion 68, and a leg portion 69 in this order from the upper side to the lower side. The housing 60 is formed by drawing a metal plate into a substantially cylindrical shape with a diameter increasing from the upper side to the lower side.

The top portion 61 has a disk shape perpendicular to the axial direction and has an opening 61a through which the rotational shaft 42 penetrates. The upper tubular portion 63 has a cylindrical shape continuous from the outer edge side of the top portion 61. The small stepped portion 65 is formed in the lower side of the upper tubular portion 63. The small stepped portion 65 is formed into a stepped shape such that the inner and outer diameters become slightly greater than those of the upper tubular portion 63 from the upper side to the lower side. The middle stepped portion 66 is located near the lower side of the small stepped portion 65 and is formed into a stepped shape such that the inner and outer diameters become greater than those of the small stepped portion 65 from the upper side to the lower side.

The lower tubular portion 67 has a cylindrical shape continuous from the outer edge of the middle stepped portion 66. The lower stepped portion 68 is formed into a stepped shape extending radially outwardly from the lower side of the lower tubular portion 67, and the thrust cover 110 is fixed to the inner surface of the lower stepped portion 68. The leg portion 69 has a circular shape further extending radially outwardly from the outer edge of the lower stepped portion 68, and is fixed to the inner bottom surface of the board 100 so as to surround the opening 101. The upper tubular portion 63 and the small stepped portion 65 partially abut the bearing 70. The small stepped portion 65 partially abuts an inner peripheral surface 51 of the stator 50. The middle stepped portion 66 partially abuts a bottom surface 53 of the stator 50. The bottom surface 53 of the stator 50 is the surface of the stator 50 in the board 100 side. The small stepped portion 65, the middle stepped portion 66, and the lower stepped portion 68 are each formed into a stepped shape, when the housing 60 is viewed in cross section including the axial direction.

The lower stepped portion 68 includes: an inner ring surface 68a having a ring shape substantially perpendicular to the axial direction of the rotational shaft 42; and an inner side surface 68a' having a small height and having a column shape substantially parallel to the axial direction. The inner ring surface 68a abuts the outer edge side of the upper surface of the thrust cover 110. The inner side surface 68a' faces the outer edge of the thrust cover 110. The thrust cover 110 is fixed to the inside of the lower stepped portion 68 with an adhesive BD so as to cover an open end of the lower side of the housing 60. In FIG. 3, the adhesive BD is represented by dotted lines of hatching. The adhesive BD is filled in the space surrounded by the thrust cover 110, the housing 60, and the board 100 so as to cover the opening 101 of the board 100. Thus, the thrust cover 110 and the housing 60 are fixed to each other with the adhesive BD without using components such as screws, thereby suppressing the number of parts from increasing and suppressing the manufacturing cost from increasing. Further, a dent portion 114 into which the thrust receiving member S is fitted is formed on the upper surface of the thrust cover 110. Further, the board 100 and the motor M correspond to a drive device.

Figure 4A:
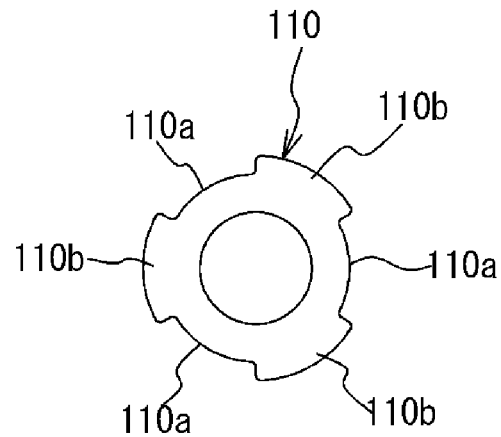
FIG. 4A is a view of a thrust cover viewed from a lower side.
Figure 4B:
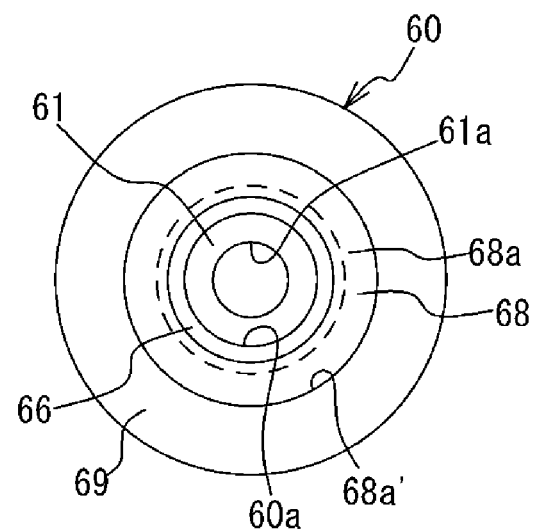
FIG. 4B is a view of a housing viewed from the lower side.
Figure 4C:
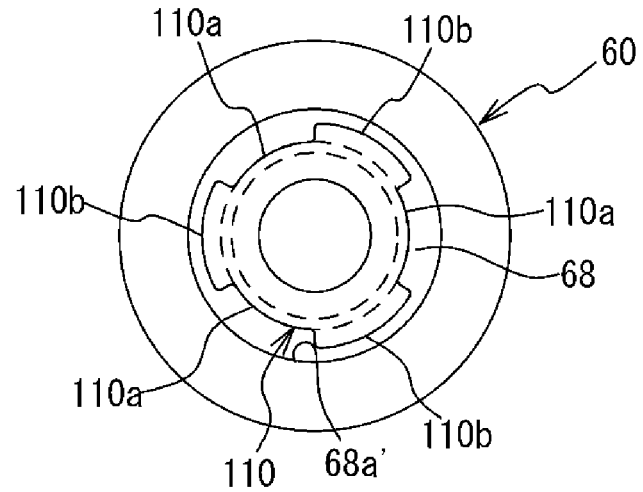
FIG. 4C is a view of the thrust cover arranged within the housing.

Next, a description will be given of the shapes of the thrust cover 110 and the opening 101 of the board 100. FIG. 4A is a view of the thrust cover 110 viewed from the lower side. FIG. 4B is a view of the housing 60 viewed from the lower side. FIG. 4C is a view of the thrust cover 110 arranged within the housing 60. The thrust cover 110 has a substantially circular plate shape. The outer edge of the thrust cover 110 includes: recessed portions 110a recessed radially inwardly from the thrust cover 110; and projection portions 110b projecting radially outwardly from the thrust cover 110. Three pairs of the recessed portion 110a and the projection portion 110b are formed. The recessed portions 110a and the projection portions 110b are formed alternately in the circumferential direction at substantially equal angular intervals.

The recessed portions 110a and the projection portions 110b face the inner side surface 68a' of the lower stepped portion 68. Since the inner diameter of the inner side surface 68a' of the lower stepped portion 68 is substantially constant, a gap GHb between the projection portion 110b and the inner side surface 68a' in the radial direction is smaller than a gap GHa between the recessed portion 110a and the inner side surface 68a' in the radial direction, as illustrated in FIG. 3. The interposing of the adhesive BD in such gaps GHa and GHb causes the thrust cover 110 to be fixed to the housing 60. The Gap GHa is an example of the first gap. Additionally, the radius of the recessed portion 110a of the thrust cover 110 is greater than that of the inner ring surface 68a of the lower stepped portion 68. Thus, the thrust cover 110 can cover the open end of the lower side of the housing 60, which prevents foreign objects from entering the housing 60. The recessed portions 110a and the projection portions 110b are examples of the second recessed portions and the second projection portions, respectively.

Figure 5:
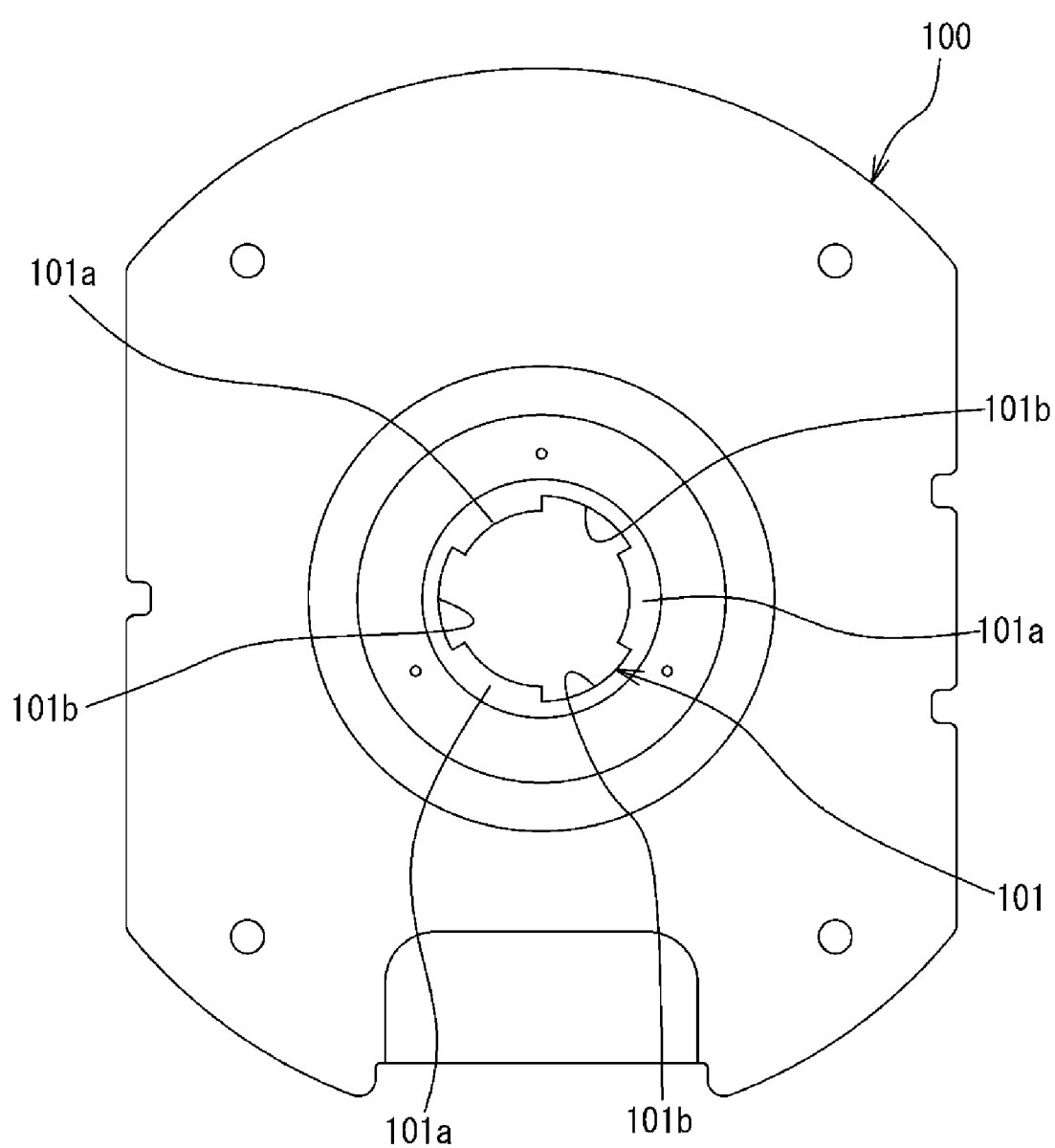
FIG. 5 is a view of a board from the lower side.

FIG. 5 is a view of the board 100 viewed from the lower side. Although the opening 101 has a substantially circular shape, the inner edge of the opening 101 includes: recessed portions 101b recessed radially outwardly from the opening 101; projection portions 101a projecting radially inwardly from the opening 101. Three pairs of the projection portion 101a and the recessed portion 101b are formed. The projection portions 101a and the recessed portions 101b are formed alternately in the circumferential direction at substantially equal angular intervals. The recessed portions 101b and the projection portions 101a are examples of the first recessed portions and the first projection portions, respectively.

Figure 6A:
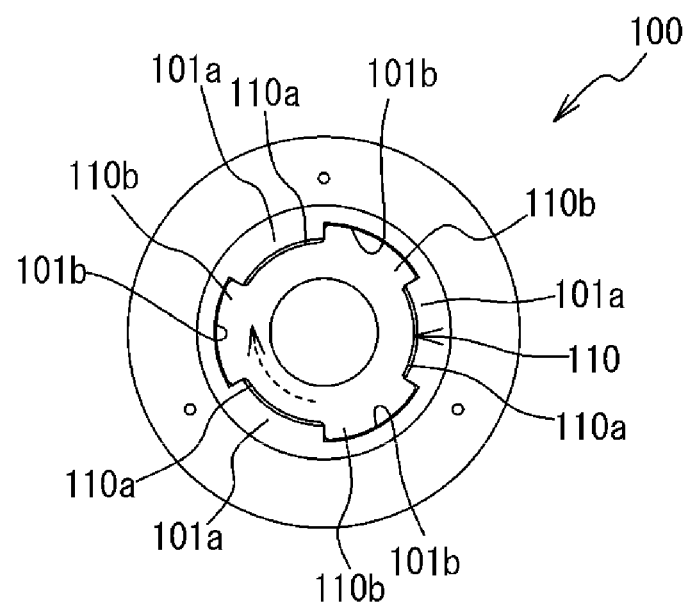
FIG. 6A and FIG. 6B are explanatory views of a method for fixing the thrust cover.
Figure 6B:
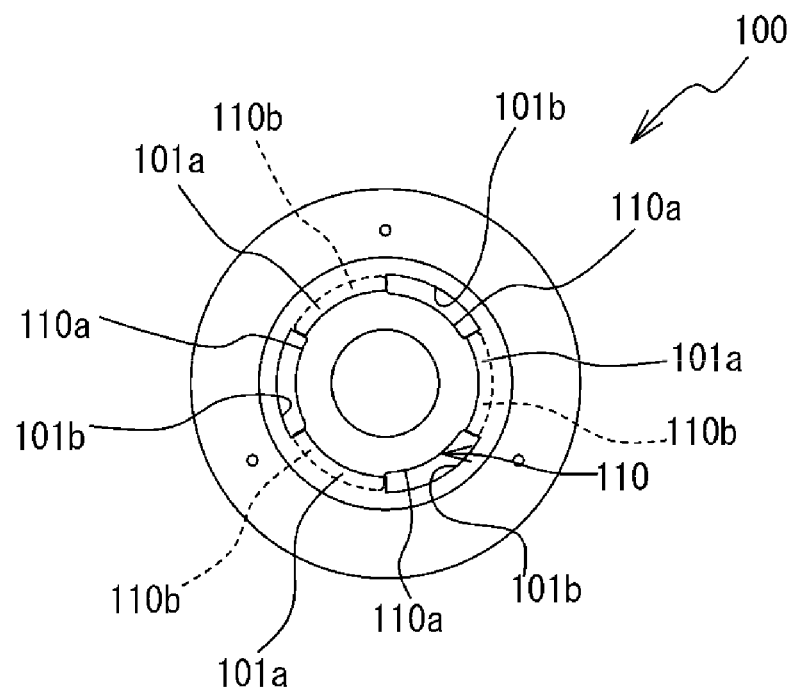

Next, a description will be given of the method for fixing the thrust cover 110 to the housing 60 fixed to the board 100. FIGS. 6A and 6B are explanatory views of the method for fixation of the thrust cover 110. The housing 60 into which the bearing 70 is press-fitted is fixed to the board 100. In this state, the thrust cover 110 is inserted into the opening 101, as illustrated in FIG. 6A. Here, the outer edge of the thrust cover 110 and the inner edge of the opening 101 have complementary shapes. That is, the recessed portion 110a and the projection portion 110b are substantially the same respectively as the projection portion 101a and the recessed portion 101b in the number, size, and shape. Specifically, the recessed portion 110a is substantially the same as the projection portion 101a in the length in the radial direction and in the length in the circumferential direction. Also, the projection portion 110b is substantially the same as the recessed portion 101b in the length in the radial direction and in the length in the circumferential direction. Moreover, the recessed portion 110a, the projection portion 110b, the projection portion 101a, and the recessed portion 101b are substantially the same in the length in the circumferential direction. Therefore, the recessed portion 110a faces the projection portion 101a and the projection portion 110b faces the recessed portion 101b, which allows the thrust cover 110 to pass through the opening 101. This enables the thrust cover 110 to be disposed between the inner bottom surface of the board 100 and the inner peripheral surface 60a of the housing 60.

Next, the thrust cover 110 is rotated relative to the opening 101 such that the recessed portion 101b faces the recessed portion 110a and the projection portion 110b overlaps the projection portions 101a when viewed in the axial direction of the rotational shaft 42, as illustrated in FIG. 6B. The overlapping of the projecting portion 110b and the projecting portion 101a restricts the thrust cover 110 from passing through the opening 101. This restricts the thrust cover 110 from falling off from the space between the board 100 and the housing 60 through the opening 101 to the outside. In this way, the passing of the thrust cover 110 through the opening 101 is allowed or restricted in response to the rotational position of the thrust cover 110. The adhesive BD is injected through the opening 101 into the space surrounded by the housing 60 and the thrust cover 110, in the state where the thrust cover 110 abuts the inner ring surface 68a and the projection portion 110b overlaps the projection portion 101a when viewed in the axial direction. Thus, the thrust cover 110 is fixed to the housing 60.

Here, also the adhesive BD is injected into the gap GA, in the axial direction, between the projection portions 101a and the projection portion 110b overlapping each other when viewed in the axial direction, as illustrated in FIG. 3. Thus, after the adhesive BD is hardened, the thrust cover 110 is fixed so as to be restricted from moving in the axial direction. The Gap GA is an example of the second gap. Also, the adhesive BD is injected into the gap GHa between the recessed portion 110a and the inner side surface 68a' as described above. The adhesives BD filled in the gap GHa is fixed to the recessed portions 110a, the inner side surface 68a', and the inner ring surface 68a. Thus, after the adhesive BD is hardened, the thrust cover 110 is fixed so as to be restricted from rotating and moving in the direction perpendicular to the axial direction. In such a manner, the adhesive BD that adheres to the three members of the thrust cover 110, the housing 60, and the board 100 is hardened. This prevents the adhesive BD from peeling off from these members, thereby suppressing the thrust cover 110 from falling off from the housing 60. Additionally, although the adhesive BD is filled in the small gap GHb between the projection portion 110b and the inner side surface 68a' in the present embodiment, the rotation of the thrust cover 110 can be restricted as long as the adhesive BD is filled in the gap GHa even if the adhesive BD is not filled in the gap GHb.

Further, as described above, before the thrust cover 110 is fixed by the adhesive, the thrust cover 110 is allowed to pass through the opening 101 in the state where the recessed portion 110a and the projection portion 110b respectively correspond to the projection portion 101a and the recessed portion 101b, thereby arranging the thrust cover 110 between the board 100 and the housing 60. It is thus easy to assemble the thrust cover 110.

In addition, Macromelt (registered trademark) OM673 of thermoplastic polyamide resin manufactured by Henkel is used as the adhesive in the present embodiment. As long as the blower device A is used under the normal use conditions as described above after this adhesive is hardened, the mutual positional relationship among the thrust cover 110, the housing 60, and the board 100 is made constant. It is thus possible to prevent the thrust cover 110 from falling off. It is also possible to readily remove the thrust cover 110 by human power with a tool. Therefore, there are advantages of facilitating disassembly for analysis of failure of the motor M, and disassembling the motor M for recycling or disposal. Moreover, since the adhesive has flexibility (micro elasticity), the adhesive is preferably used in a blower device that generates micro vibration due to the rotation of the fan. This can further suppress the thrust cover 110 from falling off and prevent vibration and noise.

Figure 7:
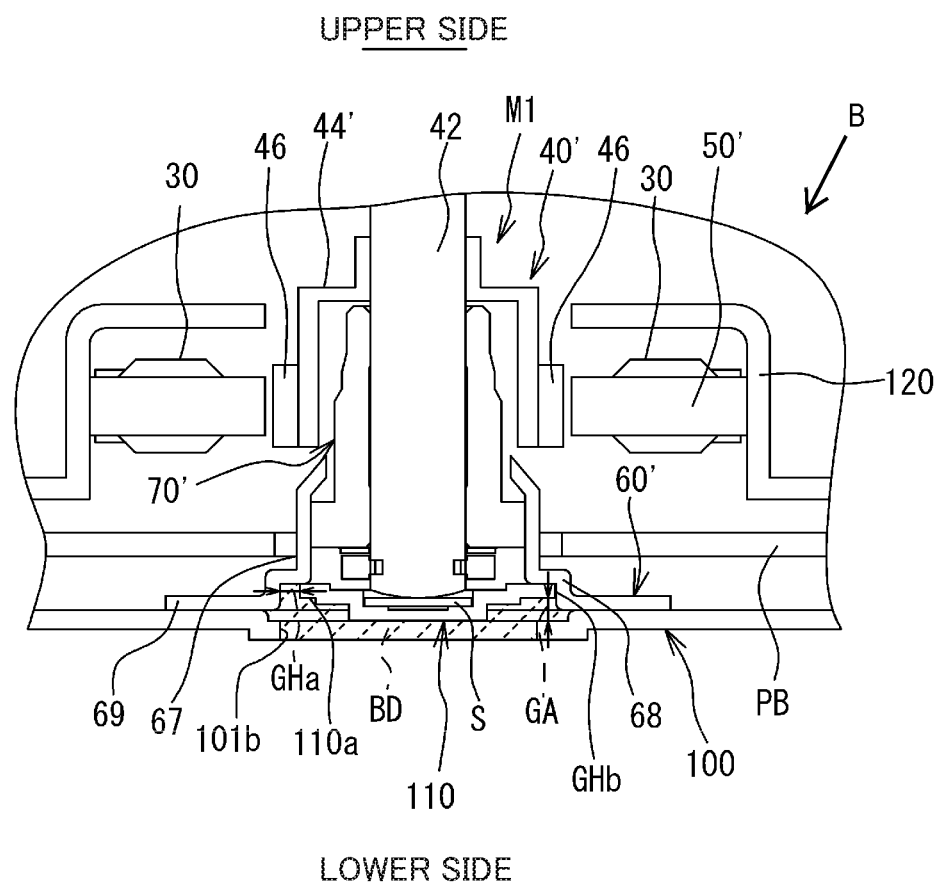
FIG. 7 is a partial cross-sectional view of a blower device adopting an inner rotor type motor.

The above embodiment has described the blower device A using the motor M of the outer rotor type. However, a motor adopted in such a blower device may be an inner rotor type. Next, a description will be given of a blower device B adopting an inner rotor type motor M1. FIG. 7 is a partial cross-sectional view of the blower device B adopting the inner rotor type motor M1. FIG. 7 is a view corresponding to FIG. 3. Additionally, the same reference numerals are given to the same components and the duplicated description is omitted.

The motor M1 includes the coils 30, a rotor 40', a stator 50', a housing 60', a printed circuit board PB, the thrust cover 110, and the like. A yoke 44' of the rotor 40' is arranged at the center of the stator 50'. At least one permanent magnet 46 is fixed to the outer peripheral surface of the yoke 44', and faces the inner peripheral side of the stator 50'. The yoke 44' is fixed to the rotational shaft 42, and the rotational shaft 42 is supported for rotation by a bearing 70'. A lower side portion of the bearing 70' projects radially, and this portion projecting radially is fitted into and held by the inner peripheral surface of the housing 60'. The housing 60', fixed to the board 100, has a length smaller than that of the housing 60 described above in the axial direction so as to avoid abutting the yoke 44'. The stator 50' is fixed to the inner peripheral surface side of a metal plate 120. A non-illustrated portion of the metal plate 120 is fixed to the board 100.

Also, the thrust cover 110, the housing 60', and the board 100 are fixed to one another by the adhesive BD, and the adhesives BD is filled in the gaps GHa, GHb, and GA in the inner rotor type motor M1. This prevents the adhesive BD from peeling off from these members, which suppresses the thrust cover 110 from falling off from the housing 60'.

While the exemplary embodiments of the present invention have been illustrated in detail, the present invention is not limited to the above-mentioned embodiments, and other embodiments, variations and modifications may be made without departing from the scope of the present invention.

In the above embodiments, the drive devices including the motor M and M1 are used as the blower devices A and B, respectively. However the present invention are not limited thereto. For example, the drive device can be used as an electric appliance, a vehicle, game equipment, a machine tool, textile equipment, a printing machine, and the like. Further, devices using the drive device may be for business use or home use.

The shape, the number, and the size of the recessed portions 110a and 101b and the projection portions 110b and 101a are not limited to the above embodiments. Further, the shapes of the outer edge of the thrust cover 110 and the inner edge of the opening 101 are not limited to the complementary shape. For example, they may not have a complementary shape, and the diameter of the recessed portion 101b may be greater than that of the projecting portion 110b. The diameter of the projection portion 101a may be greater than that of the recessed portion 110a. The recessed portion 101b may be longer than the projection portion 110b in the circumferential direction. The projection portion 101a may be shorter than recessed portion 110a in the circumferential direction. This is because the thrust cover 110 is allowed to pass through the opening 101 even in this case. Further, the thrust cover 110 has only to be restricted from passing through the opening 101 by overlapping the projection portion 101a and the projection portion 110b when viewed from the axial direction, in response to the rotational position of the thrust cover 110.

What is claimed is:

1. A drive device comprising:
   a board including an opening; and
   a motor including:
      a rotational shaft;
      a housing supporting the rotational shaft for rotation, fixed to the board so as to surround the opening, and having a cylindrical shape;
      a bearing supporting the rotational shaft for rotation and press-fitted onto an inner peripheral surface of the housing; and
      a thrust cover supporting an end of the rotational shaft and fixed onto the inner peripheral surface of the housing by an adhesive, wherein
   an inner edge of the opening includes:
      first recessed portions recessed radially outwardly from the opening; and
      first projection portions projecting radially inwardly from the opening, the first projection portions and the first recessed portions alternate on angular intervals in a circumferential direction of the rotational shaft,
   an outer edge of the thrust cover includes:
      second recessed portions recessed radially inwardly from the thrust cover; and
      second projection portions projecting radially outwardly from the thrust cover, the second projection portions and the second recessed portions alternate on angular intervals in the circumferential direction, the second recessed portions and the second projection portions face the inner peripheral surface of the housing, an inner ring surface of the housing abuts an outer edge side of an upper surface of the thrust cover such that the thrust cover is in contact with a full ring on the housing, at least the first and second projection portions partially overlap each other when viewed in an axial direction of the rotational shaft, a first gap is defined between the second recessed portion and the inner peripheral surface of the housing in a radial direction of the rotational shaft, a second gap is defined between the first and second projection portions in the axial direction of the rotational shaft, and the adhesive is filled in the first and second gaps.

2. The drive device of claim 1, wherein before the thrust cover is fixed to the housing by the adhesive, the thrust cover is allowed to pass through the opening when the first recessed portions and the first projection portions respectively face the second projection portions and the second recessed portions.

3. A blower device comprising:

a drive device including:
  a board including an opening; and
  a motor including:
    a rotational shaft;
    a housing supporting the rotational shaft for rotation, fixed to the board so as to surround the opening, and having a cylindrical shape;
    a bearing supporting the rotational shaft for rotation and press-fitted onto an inner peripheral surface of the housing; and
    a thrust cover supporting an end of the rotational shaft and fixed onto the inner peripheral surface of the housing by an adhesive, a fan rotated together with the rotational shaft; and a case including first and second openings through which air passes in response to rotation of the fan, housing the fan, assembled with the drive device, and having a scroll shape, wherein an inner edge of the opening includes:
  first recessed portions recessed radially outwardly from the opening; and
  first projection portions projecting radially inwardly from the opening, the first projection portions and the first recessed portions alternate on angular intervals in a circumferential direction of the rotational shaft, an outer edge of the thrust cover includes:
  second recessed portions recessed radially inwardly from the thrust cover; and
  second projection portions projecting radially outwardly from the thrust cover, the second projection portions and the second recessed portions alternate on angular intervals in the circumferential direction, the second recessed portion and the second projection portion face the inner peripheral surface of the housing, an inner ring surface of the housing abuts an outer edge side of an upper surface of the thrust cover such that the thrust cover is in contact with a full ring on the housing, at least the first and second projection portions partially overlap each other when viewed in an axial direction of the rotational shaft, a first gap is defined between the second recessed portions and the inner peripheral surface of the housing in a radial direction of the rotational shaft, a second gap is defined between the first and second projection portions in the axial direction of the rotational shaft, and the adhesive is filled in the first and second gaps.

4. The drive device of claim 1, wherein the thrust cover is configured to overlap a full annular portion of the housing.

5. The blower device of claim 3, wherein the thrust cover is configured to overlap a full annular portion of the housing.

* * * * *